S. Ward,
Cage Trap,
Nº 69,279. Patented Sep. 24, 1867.

Witnesses:
Theo Tusche
J. A. Service

Inventor:
Silas Ward
Per Munn & Co
Attorneys

United States Patent Office.

SILAS WARD, OF RICHMOND, ILLINOIS.

*Letters Patent No. 69,279, dated September 24, 1867.*

IMPROVEMENT IN ANIMAL TRAPS.

*The Schedule referred to in these Letters Patent and making part of the same.*

TO ALL WHOM IT MAY CONCERN:

Be it known that I, SILAS WARD, of Richmond, in the county of McHenry, and State of Illinois, have invented a new and improved Animal Trap; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved trap for catching rats, mice, ground-squirrels, quails, &c., which shall be cheap, simple in construction, not liable to get out of order, and which shall be self-setting; and it consists in the combination of the pivoted platforms, pivoted doors, connecting-rods, lever, and weight with each other and with the compartments of the trap, as hereinafter more fully described.

Figure 1:
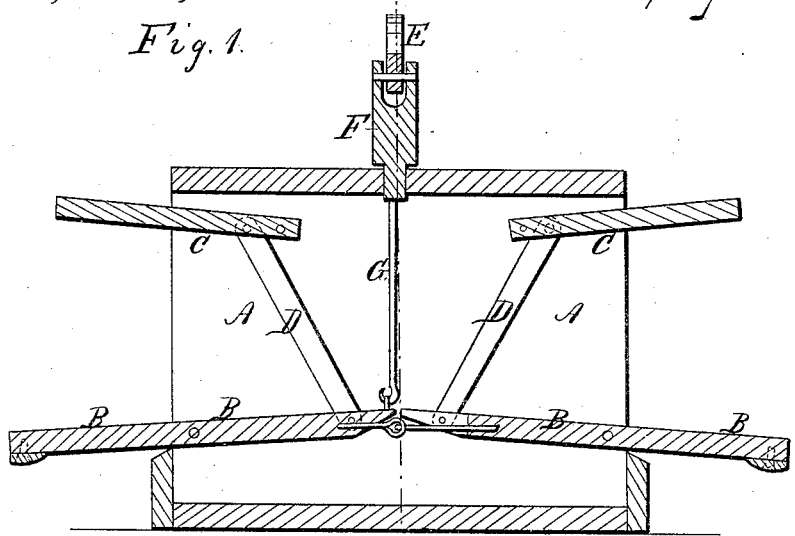
Figure 1 is a vertical longitudinal section of my improved trap taken through the line $y\ y$, fig. 2.
Figure 2:
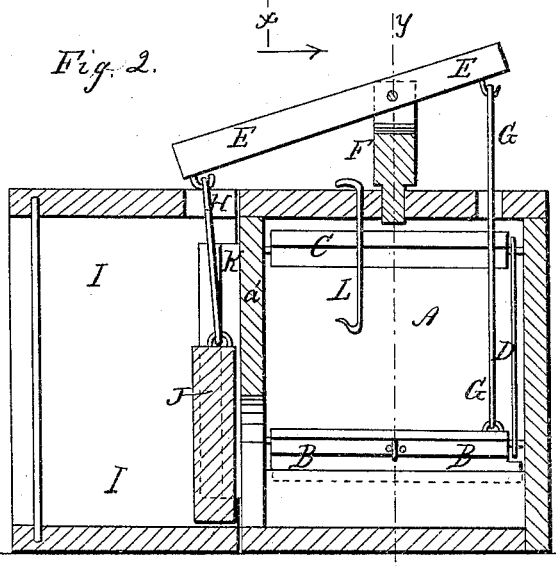
Figure 2 is a vertical cross-section of the same taken through the line $x\ x$, fig. 1.

A are the main compartments of the trap, the ends of which are left open, as shown in fig. 1. B are the platforms of the trap, the forward ends of which are connected to each other by a loose joint, so that they may move together. The side edges of the platforms B are pivoted, at or near the middle points, to the sides of the trap, as shown in fig. 1. C are the doors, which are pivoted, near the upper ends of their side edges, to the sides of the trap a short distance within the said trap, as shown in fig. 1. D are connecting-bars, the lower ends of which are pivoted to the platforms B at or near their inner ends, and their upper ends are pivoted to the side edges of the pivoted doors C a little below the points at which the said doors are pivoted to the sides of the trap. E is a lever pivoted to a support, F, attached to the top of the trap near its centre. To the shorter end of the lever E is pivoted the upper end of the connecting-rod G which passes down through a hole in the top of the trap, and its lower end is pivoted to the inner end of one or the other of the pivoted platforms B. To the longer end of the lever E is pivoted the upper end of the connecting-rod H which passes down through a hole or notch in the edge of the top of the compartment I, and to its lower end is attached a weight, J, which slides up and down along the side of the partition $a'$ which separates the compartments A and I, being kept in place by grooved cleats K attached to the sides of said partition. Through the lower part of the partition $a'$ is formed a hole, as shown in fig. 2, which said hole is covered by the weight J when lowered. The compartment I is removable, so that the animals caught may be readily removed. One side of the compartment I may be formed by a grating, so as to admit light and air into the compartment.

In using the trap, it is "set" by placing the various parts in the position shown in the drawing, with the bait suspended from the bait-hook L. The animals enter the trap by walking upon one or the other of the platforms B. As they approach the bait their weight upon the forward end of said platform depresses the inner ends of the platforms B, and by means of the connecting-bars D closes the doors C. The same movement of the platforms B operates the lever E and raises the weight J, uncovering the hole through the partition $a'$, through which hole the animal immediately rushes. As soon as the animal leaves the platforms B the weight J descends, closing the hole through the partition $a'$, and again sets the trap.

What I claim as new, and desire to secure by Letters Patent, is—

The combination of the pivoted platforms B, connecting-bars D, pivoted doors C, connecting-rod G, lever E, connecting-rod H, and weight J, with each other and with the compartments of the trap, substantially as herein shown and described.

SILAS WARD.

Witnesses:
ALF. P. WELLS,
H. H. SHELDON.